United States Patent [19]
Mak

[11] Patent Number: 5,993,188
[45] Date of Patent: Nov. 30, 1999

[54] FOOD EXTRUDING DEVICE

[76] Inventor: King Biu Mak, Room A12, 5/F., Block A2, Yau Tong Ind City, 17 Ko Fai Road, Yau Tong, Kowloon, The Hong Kong Special Administrative Region of the People's Republic of China

[21] Appl. No.: 08/974,707

[22] Filed: Nov. 19, 1997

[51] Int. Cl.⁶ .................................................. B29C 47/08
[52] U.S. Cl. ......................... 425/376.1; 425/449; 222/95; 222/390
[58] Field of Search .................................. 425/376.1, 449, 425/448, 256; 222/386.5, 390, 95; 426/516

[56] References Cited

U.S. PATENT DOCUMENTS

| | | | |
|---|---|---|---|
| 3,985,273 | 10/1976 | Davis, Jr. | 222/390 |
| 3,997,084 | 12/1976 | Davis, Jr. | 222/390 |
| 4,258,866 | 3/1981 | Bergman | 222/333 |
| 4,360,332 | 11/1982 | Cyin | 425/376.1 |
| 4,583,934 | 4/1986 | Hata et al. | 425/376.1 |
| 4,815,961 | 3/1989 | Kindred | 425/376.1 |
| 4,993,932 | 2/1991 | D'Andrade | 425/376.1 |
| 5,207,357 | 5/1993 | Aronie et al. | 222/390 |
| 5,242,082 | 9/1993 | Griannuzi | 222/390 |
| 5,700,494 | 12/1997 | Masse et al. | 425/131.1 |

*Primary Examiner*—Khanh P Nguyen
*Attorney, Agent, or Firm*—Pollock, Vande Sande & Priddy

[57] ABSTRACT

An extruder for paste-like food substances including a barrel provided at one end with an outlet from which the paste-like food substance can be extruded in either measured amounts or in a steady flow, a rotatable screw is located within the barrel and is capable of being rotated and moved vertically within the barrel, a clutch located within a housing is capable of engaging the screw to ensure measured amounts of paste-like food are extruded or capable of being disengaged from the screw to permit the screw to be freely rotated and moved vertically within the barrel to permit the paste-like food substance to be extruded from the outlet in a steady flow.

6 Claims, 6 Drawing Sheets

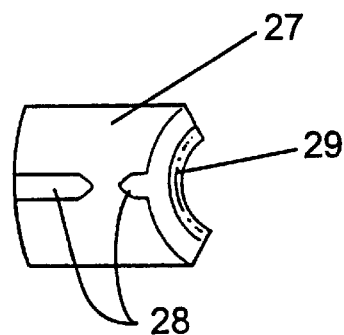
FIGURE 6(a)
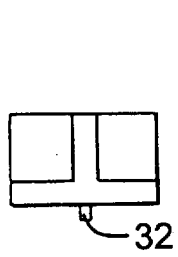
FIGURE 6(b)
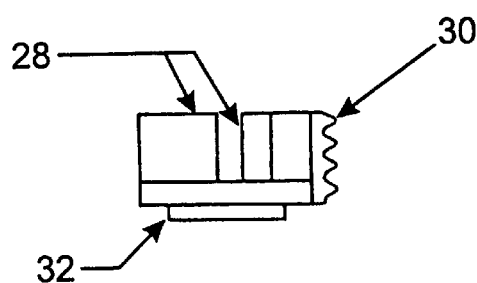
FIGURE 6(c)      FIGURE 6(d)
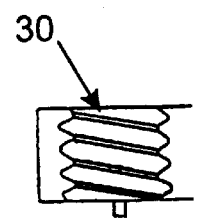
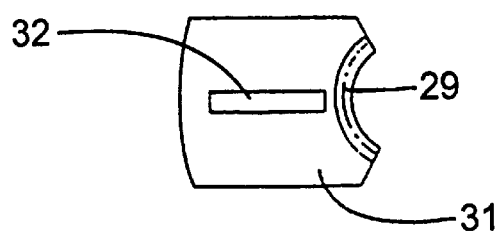
FIGURE 6(e)

FOOD EXTRUDING DEVICE

FIELD OF THE INVENTION

The present invention relates to a device for extruding paste-like food substances such as cookie dough or icing which can be used in two operational modes.

BACKGROUND TO THE INVENTION

There are various situations where it is desirable to extrude a precise amount of food or to extrude a steady flow of food, eg. when making cookies where it is desirable that each cookie be of approximately the same size or where one wishes to control the flow of icing onto a cake.

There are various devices available in the market which deliver a measured amount of biscuit or cookie paste or dough to a baking tray prior to cooking. Such devices all work on the principle of what might be called a pistol-grip, operation of which causes a pawl to engage and disengage the teeth of a piston rod to permit the piston to advance a predetermined distance along the barrel to deliver a predetermined amount of paste-like food through an outlet.

The disadvantages of such devices is that the amount of paste-like food delivered through the outlet is predetermined by the size of the teeth on the piston rod and cannot be varied to suit the wishes of the user.

BRIEF SUMMARY OF THE INVENTION

It is the principle object of the invention to provide an improved extruding device in which the user can determine the amount of paste-like food to be delivered through the outlet.

The invention provides an extruder for paste-like food substances comprising a barrel to hold the paste-like food substance and provided at one end with an outlet from which the paste-like food substance can be extruded in either measured amounts or in a steady flow, a rotatable screw is located within the barrel and is capable of being rotated and moved vertically within the barrel by means of a handle to extrude the paste-like food through the outlet, a clutch is located within a housing forming the closure for other end of the barrel and is capable of engaging the screw to ensure measured amounts of the paste-like food are extruded or is disengaged from the screw to permit the screw to be freely rotated and moved vertically within the barrel to permit the paste-like food substance to be extruded from the outlet in a steady flow.

The handle may be position on the upper end of the screw or it may engage the screw by means of a gear arrangement located within the clutch housing. The extruder can be provided with a detachable handle so that same can be located in either of the positions previously indicated according to the user's preference.

In a preferred embodiment the clutch comprises a lower annular disc provided with two or more radial slits, two or more chucks capable of moving radially within the slits of the lower annular disc and having inner surfaces provided with threads capable of engaging the threads on the screw, an upper annular disc provided on its under surface with two or more pawls movable by means of a switch to move the chucks into and out of engagement with the screw.

Alternatively the chucks can be hinged to the lower annular disc.

The outlet of the barrel may be provided with any one of a selection dies through which cookie dough may be extruded to form differently shaped cookies or alternatively the outlet of the barrel may be provided with any one of a selection of nozzles through which icing may be extruded in different patterns. The extruder may be provided with a special connector to the nozzle so that the barrel can accommodate a disposable bag containing icing.

The screw may be provided at its upper end with a neck and a spring which ensures that even when the screw has been rotated so that the clutch mechanism is at its upper limit, engagement of the chucks with the screw can be maintained by rotating the screw in the opposite direction.

For example, when the screw is rotated clockwise to move the plunger towards the cookie disk or icing nozzle finally the screw reaches a stage where the chuck's internal threads remain entirely in the neck of the screw if there is no spring present. This prevents the screw threads engaging the chuck's internal thread again while the screw is rotated in an anti-clockwise direction because no pressure is applied to force the screw to engage the chucks to make the engagement. The spring is in the form of eg., a flexible plastic cap or a coil to withstand pressure while it is compressed and to retain to it's original shape or length. Also this spring is located at a position so that it is compressed during the last turn of the engagement of the chucks and screw. At this stage, pressure stored up inside the spring will ensure the screw threads contact the chuck's internal threads all the time while the user keeps on rotating the screw clockwise. In other words, the engagement of the chucks and screw can be maintained while the chucks are at the screw neck position and the user rotates the screw in the opposition direction, ie. anti-clockwise.

BRIEF DESCRIPTION OF THE DRAWINGS

FIGS. 6(a), 6(b), 6(c), 6(d) and 6(e) show respectively, a plan view, a first end view, an elevational view, a second end view and an underneath view of a clutch for use in the clutch mechanism of the extruder of the present invention;

As shown in FIGS. 1 to 3, the extruder shown generally as 1 comprises a barrel 2 closed at one end by a housing 7 and in which is located a screw 3 having vertical grooves 3b running the whole length thereof and to one end of which is attached a plunger 4. The other end of screw 3 is provided with a neck 3a and a spring 5. A handle 6 may be attached to the top of the screw 3 as shown in FIG. 1 or through an opening in housing 7 to a gear 8 which meshes with an annular crown gear 9. The inner surface of the annular crown gear 9 is provided with ribs 9a in which correspond to and engage into the grooves 3b on the screw 3. The other end of the screw 3 is provided with detachable collar 10 which is arranged to accommodate either a cookie disc 11 provided with holes 12 as shown in FIGS. 1 and 2 or with an icing nozzle 13.

Figure 1:
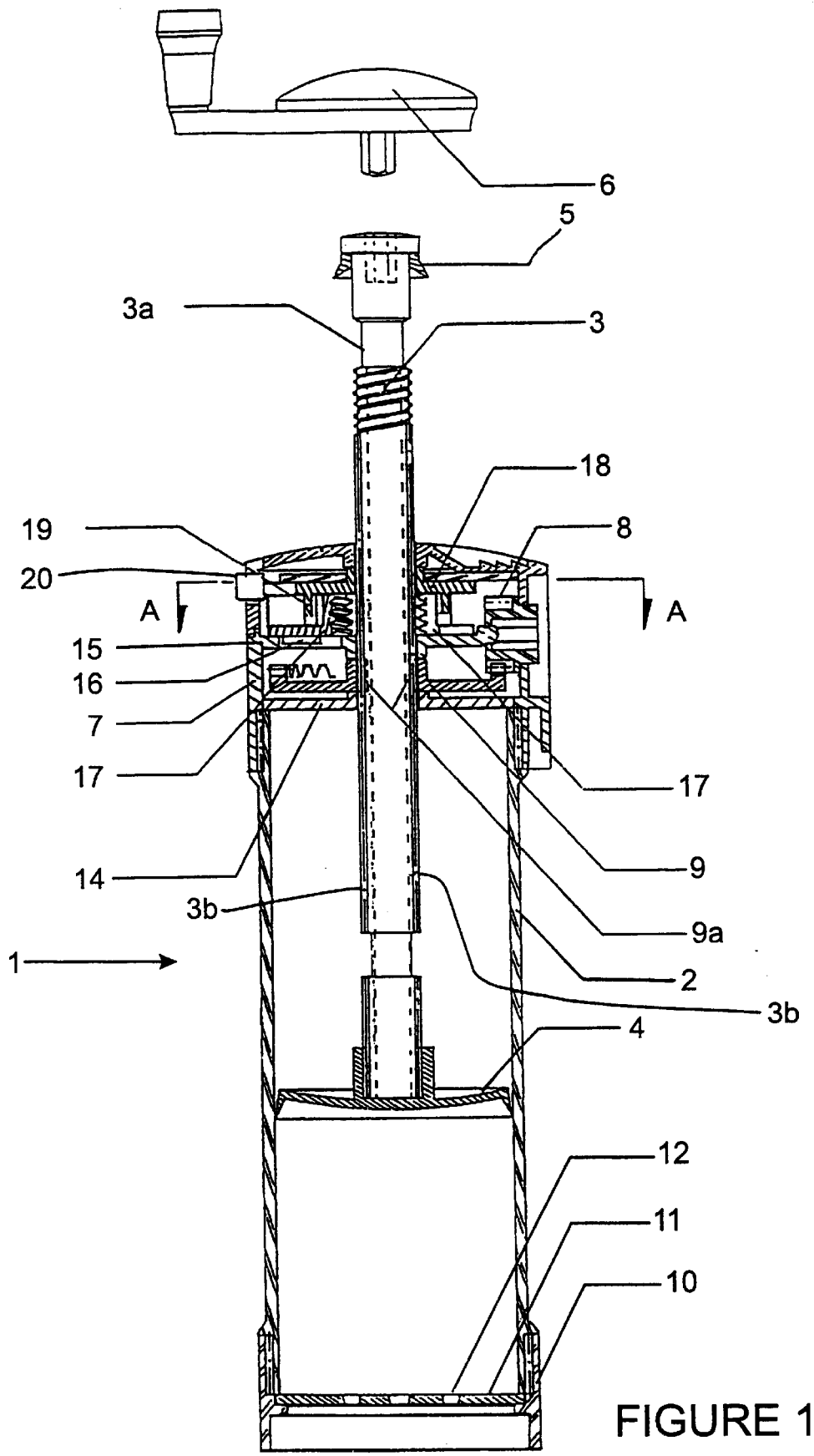
FIG. 1 is a half sectional elevation of an extruder in accordance with the present invention in which the clutch is disengaged.
Figure 2:
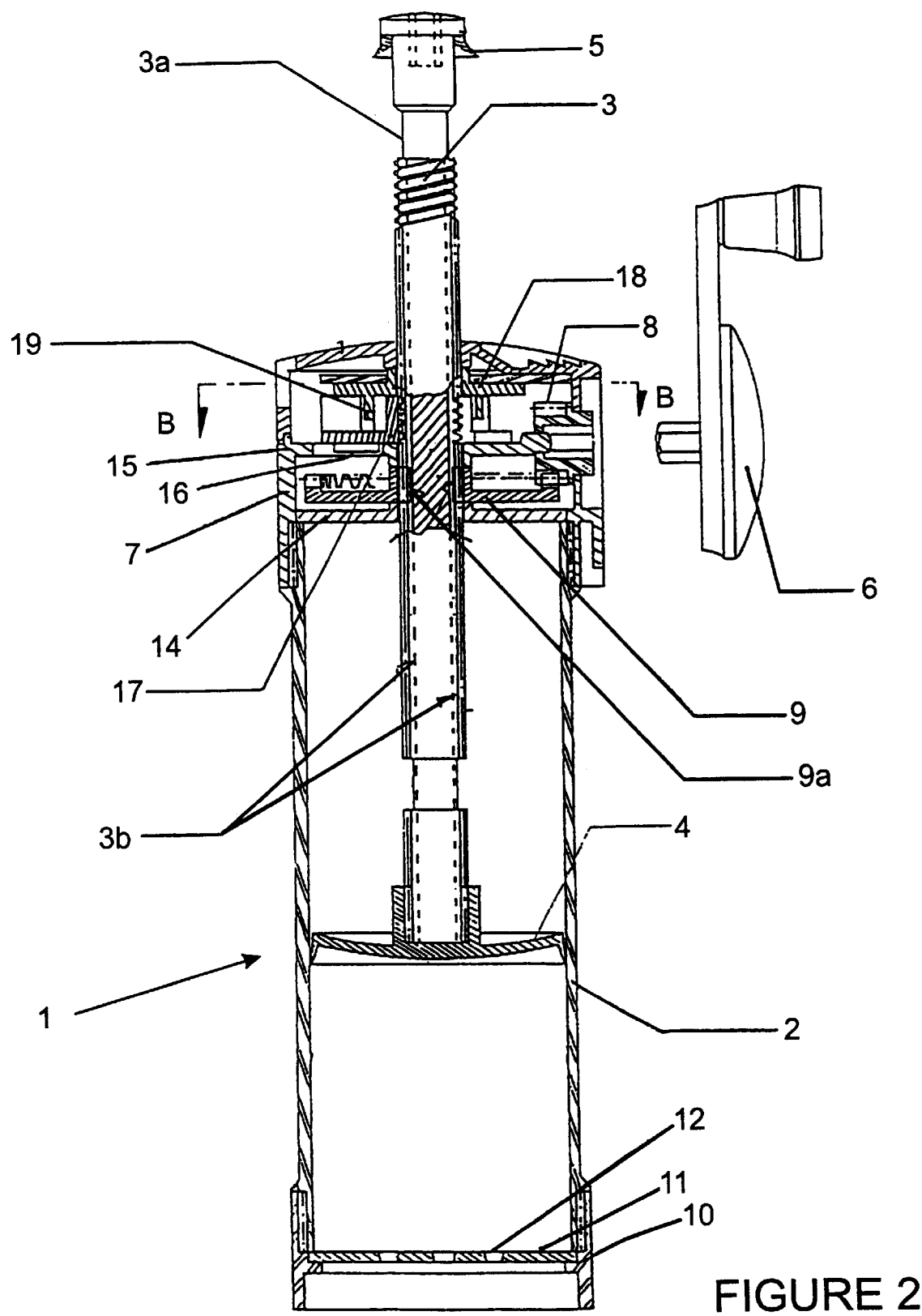
FIG. 2 is a half sectional elevation of an extruder in accordance with the present invention in which the clutch is engaged.

Housing 7 houses a plate 14 on which is mounted the crown gear 9, and accommodates the clutch mechanism (shown in detail in FIGS. 4 & 5) which clutch mechanism comprises a lower annular disc 15 provided with two or more radial slits along which a rib 16 of a chuck 17 can move in a radial direction thereby engaging and disengaging the threads of the chuck 17 (shown in detail in FIG. 6) with the threads of screw 3, and an upper annular disc 18 provided with two or more pawls 19 adapted on rotation of disc 18 by means of switch 20 to move the chucks 17 into and out of engagement with screw 3.

Figure 3:
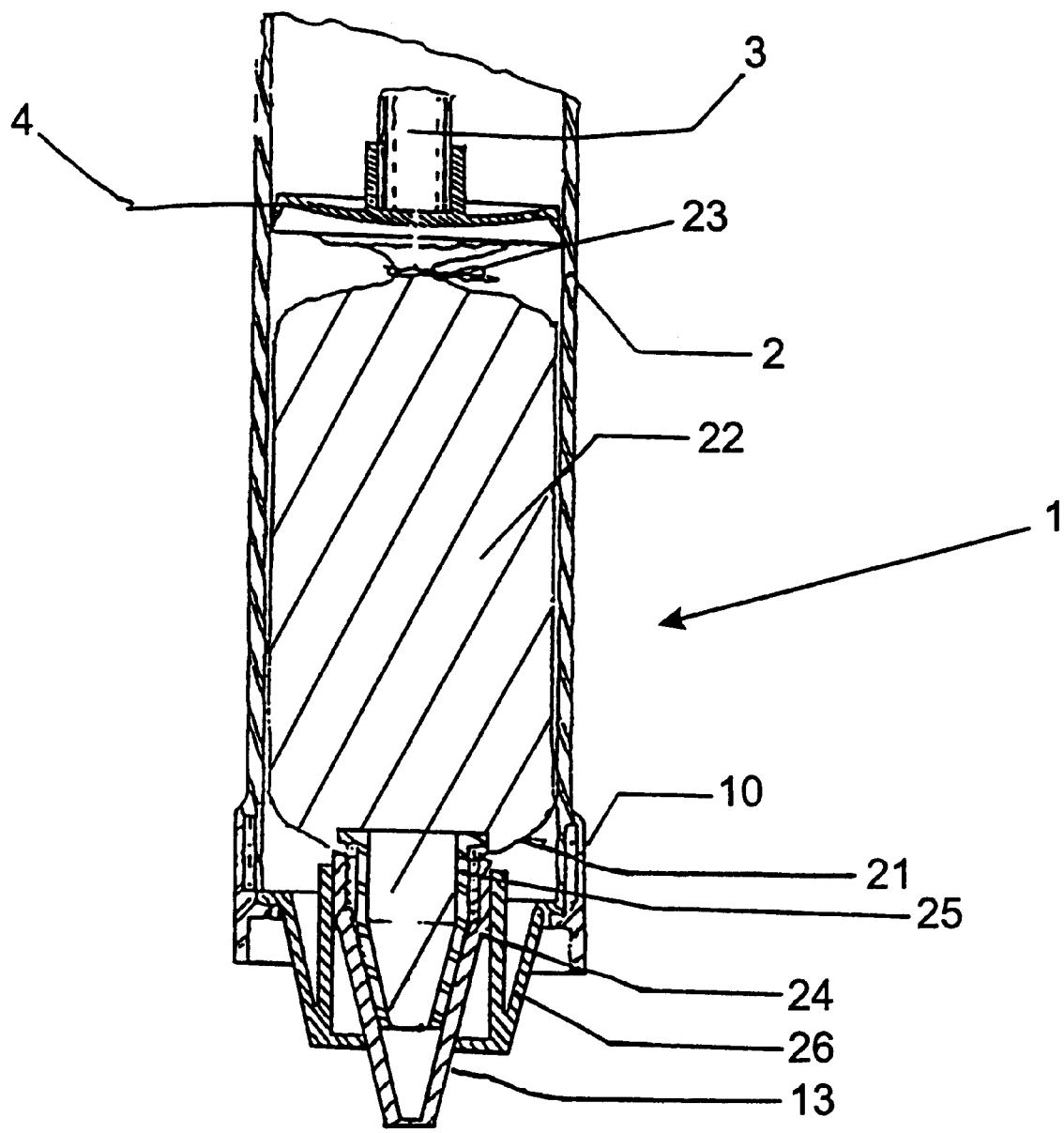
FIG. 3 is a partial sectional elevation of an extruder in accordance with the present invention showing a disposable icing bag located within the barrel.

In FIG. 3, the extruder is shown accommodating a disposable icing bag 21 full of icing 22. The neck of the bag 21 is secured by a tie 23 and its lower end 24 is located between a coupler 25 and the icing nozzle 13. The nozzle 13 and coupler 25 are located within adaptor 26 arranged to be accommodated within collar 10.

Figure 4:
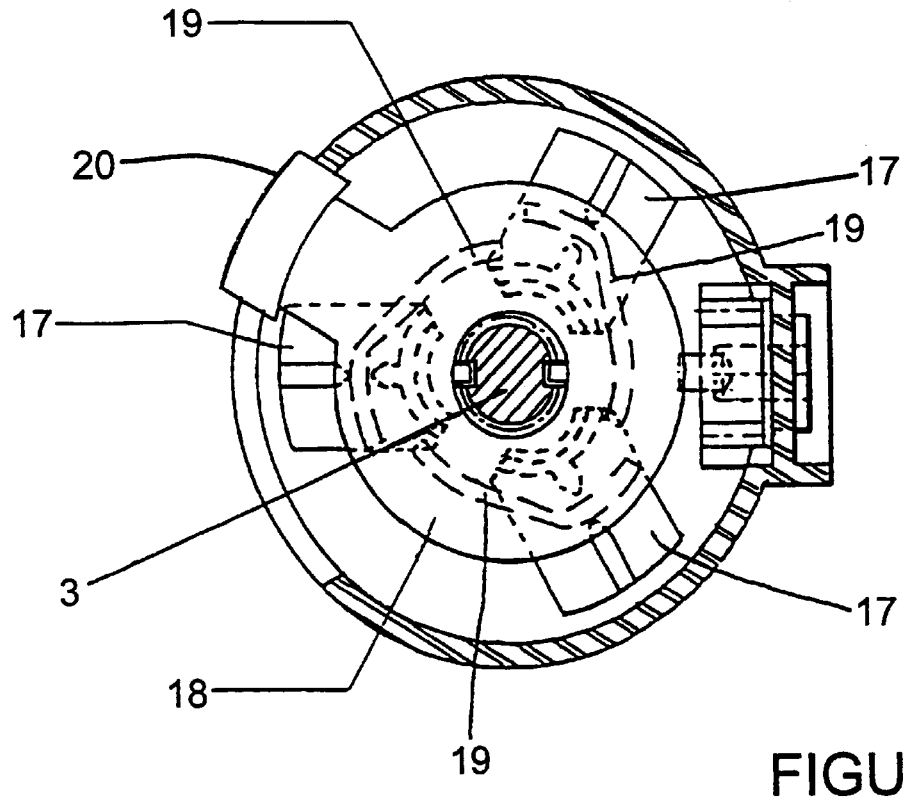
FIG. 4 is a plan view along section line A—A of FIG. 1.
Figure 5:
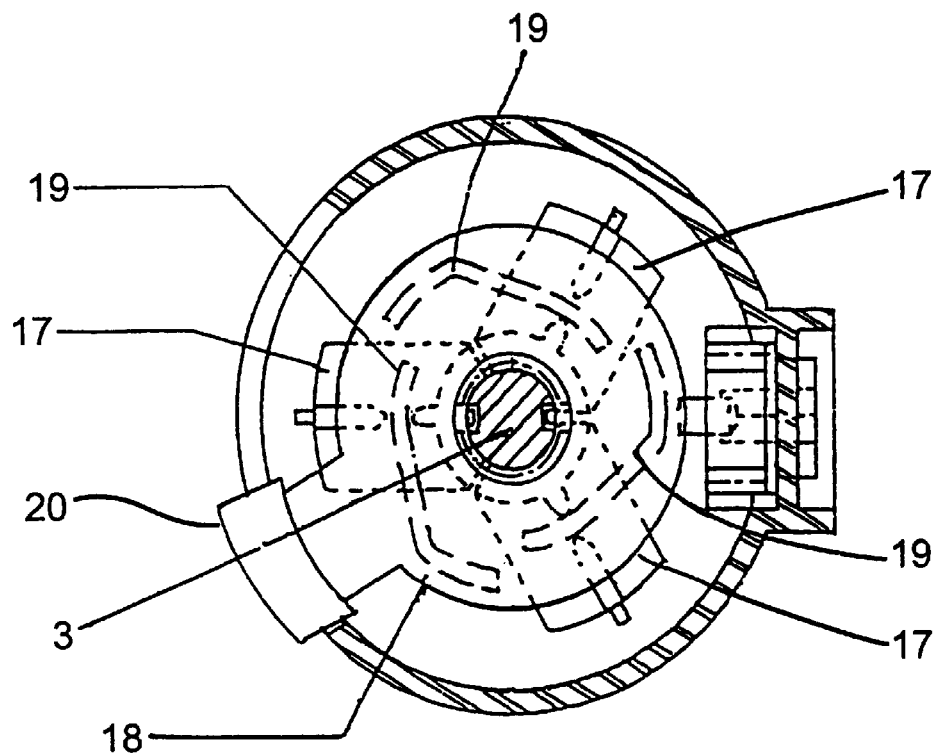
FIG. 5 is a plan view along section line B—B of FIG. 2.

FIGS. 4 and 5 show the essential parts of the clutch mechanism in plan view with the arrangement being in the disengaged position in FIG. 4 and in the engaged position in FIG. 5. In this particular embodiment, the clutch mechanism consists of three chucks 17 moved in and out of engagement with screw 3 by means of three pawls 19 mounted on disc 18.

As shown in FIGS. 6(*a*) to 6(*e*), each chuck 17 consists of an upper surface 27 having an upstanding indented rib 28 (to engage a pawl 19), a curved inner surface 29 provided with threads 30 and a lower surface 31 provided with a depending rib 32 to move radically within a radial slit in the lower annular disc 15.

Figure 7A:
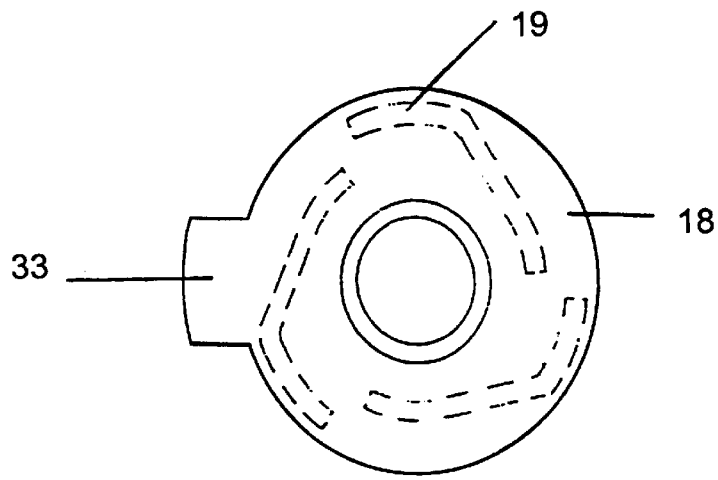
FIGS. 7(a), 7(b), 7(c) and 7(d) show respectively, a plan view, an end view, an elevational view and an underneath view of an upper annular disc with pawls for use in the clutch mechanism of the extruder of the present invention.
Figures 7B, 7C:
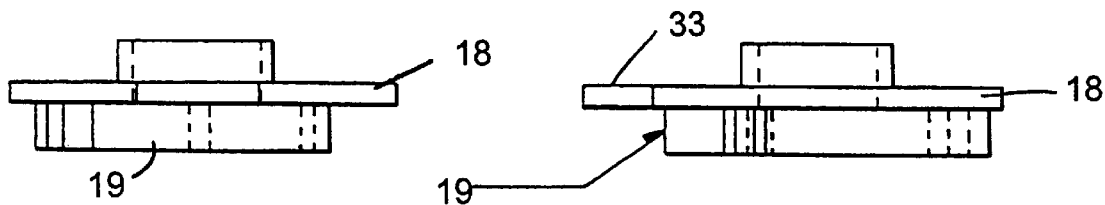
Figure 7D:
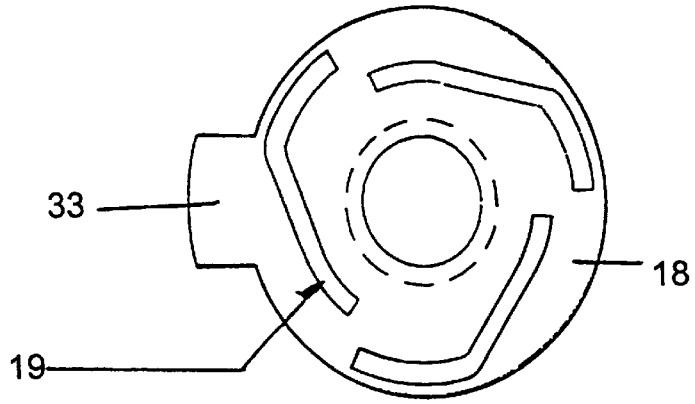

As shown in FIGS. 7(*a*) to 7(*b*), the upper disc 18 is provided with a protrusion 33 arranged to be moved in a lateral direction by switch 20. The under side of disc 18 is provided with three pawls 19.

A latitude of modification, change and substitutions intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. An extruder for paste-like food substances comprising a barrel to hold the paste-like food substance and provided at one end with an outlet from which the paste-like food substance can be extruded in either measured amounts or in a steady flow, a rotatable screw is located within the barrel and is capable of being rotated and moved vertically within the barrel by means of a handle to extrude the paste-like food through the outlet, a clutch is located within a housing forming the closure for other end of the barrel and is capable of engaging the screw to ensure measured amounts of the paste-like food are extruded or is disengaged from the screw to permit the screw to be freely rotated and moved vertically within the barrel to permit the paste-like food substance to be extruded from the outlet in a steady flow.

2. An extruder of claim 1, wherein the handle is located on the upper end of the screw.

3. An extruder of claim 1 wherein the handle engages the screw by means of a gear arrangement located within the clutch housing.

4. An extruder of claim 3 wherein the gear arrangement comprises a first gear which is rotated by the handle and which engages the teeth of an annular crown gear, the inner surface of the crown gear being provided ribs which correspond to and engage into grooves on the screw.

5. A extruder of claim 1, wherein the clutch comprises a lower annular disc provided with two or more radial slits, two or more chucks capable of moving radially within the slits of the lower annular disc and having inner surfaces provided with threads capable of engaging the threads on the screw, an upper annular disc provided on its under surface with two or more pawls movable by means of a switch to move the chucks into and out of engagement with the screw.

6. An extruder of claim 1, wherein the screw is provided with a neck portion and above that a spring to ensure that when the clutch is engaged with the screw that engagement remains even when the clutch is at its upper limit with respect to the screw.

\* \* \* \* \*